UNITED STATES PATENT OFFICE.

CLEBURNE A. BASORE, OF PITTSBURGH, PENNSYLVANIA, ASSIGNOR OF ONE-HALF TO THE KOPPERS COMPANY, OF PITTSBURGH, PENNSYLVANIA, A CORPORATION OF PENNSYLVANIA.

PURIFICATION OF LIQUIDS.

1,323,239.                         Specification of Letters Patent.         Patented Dec. 2, 1919.

No Drawing.        Application filed February 15, 1919.   Serial No. 277,290.

*To all whom it may concern:*

Be it known that I, CLEBURNE A. BASORE, a citizen of the United States, residing at Pittsburgh, in the county of Allegheny and State of Pennsylvania, have invented a new and useful Improvement in Purification of Liquids, of which the following is a full, clear, and exact description.

The present invention relates to the purification of liquids and particularly to the purification of the waste liquors from industrial plants so that they may be discharged into streams without polluting the stream water. The invention is described with particular reference to its embodiment in a process of purifying the waste liquor from the ammonia stills of the by-product coke industry.

It is to be understood, however, that the invention is not limited in its application to this industry but may be otherwise employed.

Referring to the process as employed for treating the waste ammonia still liquor:

The raw ammonia still waste has objectionable properties which should be removed before it is discharged into a stream, in order to prevent the pollution of the water thereby. The objectionable properties of the ammonia still waste are its harmful effect on fish, its disagreeable odor, its disagreeable taste and its dark color. These properties are largely due to the presence of phenoloid bodies, thiocyanates and sulfids. Small traces of pyridin and other organic compounds not yet identified may contribute to its harmful or disagreeable qualities.

Besides the above impurities there are large quantities of calcium salts, principally calcium chlorid, present in the waste liquor. However, since the waste liquor is greatly diluted in the stream to which it is finally drained, the presence of these salts is not particularly objectionable. The present process has to do particularly with the removal of those substances of the ammonia still waste which give it its harmful effect on fish, its disagreeable odor and taste and its dark color.

The ammonia still waste liquor is drawn from the still hot and while hot is aerated, preferably by running it through an aeration tower filled with baffles, coke or other material over which the liquor trickles in contact with the air. This causes some evaporation of the water and thereby concentrates the liquor to some extent. It also permits the evaporation of some of the volatile constituents of the liquid and thereby gets rid of some of the disagreeable odor. The aeration of the liquid also causes a more ready precipitation of the solids in the subsequent step of treatment in the settling tank. While it is preferred to aerate the liquor, this step may be omitted.

The liquor is next run into a settling tank where it remains for about twenty-four hours. During this time about 95 per cent. of the precipitable solids settle out of the liquid.

The liquid is drawn next from the settling tank and filtered through an inorganic material, preferably granulated blast furnace slag. This filtration completes the removal of the solids which do not settle out in the settling tank and also removes the tarry matter from the liquor, and if the slag employed contains iron oxids such as are found in the "spent" slag which results from the treatment of mine water by the process of the Heckman Patent 1,171,046 of February 8th, 1916, the sulfids are also removed from the liquor. These sulfids exist in the liquor principally as calcium sulfids. The spent blast furnace slag also partially removes some of the cyanogen compounds. While it is preferred to use the slag with the iron oxids resulting from the treatment of mine water or the like, the iron oxids might be otherwise supplied to the slag or inorganic filtering material used for this step of the process.

The filtered liquor may then be treated for the removal and recovery of cyanogen compounds. This is preferably accomplished by the addition to the liquor of a compound such as ferrous salt, which will precipitate the ferro-cyanids followed by the addition of cupric sulfate and ferrous sulfate, which results in the precipitation of cuprous thiocyanate. This step may be omitted if desired.

The next step in the process is the treatment of the liquor with animal charcoal. This treatment is preferably carried out by filtering the liquid through the animal charcoal. The animal charcoal removes substantially all of the remaining obnoxious substances which give the liquor its harmful qualities, disagreeable smell, taste and dark color. The liquor after passing through the animal charcoal is substantially colorless and substantially odorless and when diluted in the water of the stream into which it is discharged, is non-poisonous to fish life and harmless to the water for drinking purposes.

The treatment of the liquor with animal charcoal by filtering the liquor through a filter bed of animal charcoal permits rapid treatment of the liquor and I have found, sufficiently removes the obnoxious substances.

The liquor after the treatment with the animal charcoal may, if desired, be run through an earth filter bed before being discharged into the stream, in order to effect even a more complete removal of the impurities from the water.

The animal charcoal after it is fouled by the absorption of the obnoxious substances from the liquor, is recharred in order to revivify it for further use. The recharring is carried out by heating the animal charcoal to about 650 degrees centigrade in a non-oxidizing atmosphere such, for example, as heating it in a retort. The revivified animal charcoal may be re-used in this liquor purifying process, the charcoal going through a cyclical treatment of alternate use and revivification.

Certain industrial waste liquors which contain a minimum of solid impurities, sulfur and cyanogen compounds, for example the effluents from certain ammonia stills, may be treated directly with the animal charcoal without any preliminary treatment of the liquor. In general however, the preliminary treatment is preferable as it decreases the amount of the animal charcoal necessary.

While the preferred embodiment of the invention has been specifically described, it is to be understood that the invention is not limited to such embodiment and that some of the steps may be omitted and other variations may be made within the scope of the following claims.

I claim:

1. The herein described process of purifying liquors containing phenoloid bodies, comprising, filtering the liquor through a filter bed of animal charcoal whereby the phenoloid bodies are absorbed by the animal charcoal, recharring the animal charcoal, and re-using the recharred animal charcoal for the treatment of more liquor; substantially as described.

2. The herein described process of purifying liquors containing phenoloid bodies, comprising, filtering the liquor through a filter bed of animal charcoal in which the phenoloid bodies are absorbed by the animal charcoal, recharring the animal charcoal by heating it in a non-oxidizing atmosphere, and re-using the recharred animal charcoal for filtering more liquor; substantially as described.

3. The herein described process of purifying liquors containing phenoloid bodies, comprising, filtering the liquor through a filter bed of animal charcoal whereby the phenoloid bodies are absorbed by the animal charcoal, recharring the animal charcoal by heating it to a temperature in the neighborhood of 650 degrees centigrade in the absence of free air, and re-using the recharred animal charcoal for the treatment of more liquor.

4. The herein described process of purifying waste ammonia still liquor, comprising, filtering the liquor through an inorganic filtering material, then filtering the liquor through a filter bed of animal charcoal, recharring the animal charcoal and re-using the recharred animal charcoal for the treatment of more liquor; substantially as described.

5. The herein described process of purifying waste ammonia still liquor, comprising, allowing the solid substances to settle therefrom, filtering the liquor through a filtering material which removes the remaining solid substances but which does not remove the phenoloid bodies therefrom, and thereafter filtering the liquor through a filter bed of animal charcoal whereby the phenoloid bodies are absorbed by the animal charcoal, recharring the animal charcoal and re-using the recharred animal charcoal for the treatment of more liquor; substantially as described.

6. The herein described process of purifying waste ammonia still liquor, comprising, aerating the liquor, separating the solids therefrom by settling, filtering the liquor through an inorganic filtering material, and thereafter filtering the liquor through a filter bed of animal charcoal, recharring the animal charcoal and re-using the recharred animal charcoal for the treatment of more liquor; substantially as described.

7. The herein described process of purifying waste ammonia still liquor, comprising, preliminarily clarifying the liquor, and filtering the clarified liquor through a filter bed of animal charcoal, recharring the animal charcoal and re-using the recharred animal charcoal for the treatment of more liquor; substantially as described.

8. The herein described process of purifying waste liquors containing phenoloid bodies, comprising filtering the liquor through a filtering material containing iron oxid, then filtering the liquor through a filter bed of animal charcoal, recharring the animal charcoal after it becomes fouled, and reusing the recharred animal charcoal for the filtration of more liquor, substantially as described.

9. The herein described process of purifying waste liquor containing phenoloid bodies, comprising filtering the liquor through "spent" blast furnace slag, then filtering the liquor through a filter-bed of animal charcoal, recharring the animal charcoal after it becomes fouled, and reusing the recharred animal charcoal for the filtration of more liquor, substantially as described.

In testimony whereof, I have hereunto set my hand.

CLEBURNE A. BASORE.